United States Patent
Irani

(10) Patent No.: US 10,797,787 B2
(45) Date of Patent: Oct. 6, 2020

(54) SPACE NETWORK NODE RECEIVING DATA FROM TERRESTRIAL AND SPACE NODES

(71) Applicant: AIRBUS DEFENCE AND SPACE LIMITED, Hertfordshire (GB)

(72) Inventor: Shahruzi Irani, Hertfordshire (GB)

(73) Assignee: AIRBUS DEFENSE AND SPACE LIMITED, Hertforshire (GB)

( * ) Notice: Subject to any disclaimer, the term of this patent is extended or adjusted under 35 U.S.C. 154(b) by 15 days.

(21) Appl. No.: 15/544,746

(22) PCT Filed: Jan. 19, 2016

(86) PCT No.: PCT/EP2016/051038
§ 371 (c)(1),
(2) Date: Jul. 19, 2017

(87) PCT Pub. No.: WO2016/116461
PCT Pub. Date: Jul. 28, 2016

(65) Prior Publication Data
US 2018/0013486 A1 Jan. 11, 2018

(30) Foreign Application Priority Data
Jan. 20, 2015 (EP) .................................... 15275022

(51) Int. Cl.
*H04B 7/185* (2006.01)
*H04B 7/195* (2006.01)

(52) U.S. Cl.
CPC ..... *H04B 7/18521* (2013.01); *H04B 7/18519* (2013.01); *H04B 7/195* (2013.01)

(58) Field of Classification Search
None
See application file for complete search history.

(56) References Cited

U.S. PATENT DOCUMENTS

| 6,614,769 B1* | 9/2003 | Erlick ................. H04W 36/30 370/331 |
| 2007/0123252 A1* | 5/2007 | Tronc ................ H04B 7/18563 455/427 |

(Continued)

FOREIGN PATENT DOCUMENTS

| WO | 2006038992 | 4/2006 |
| WO | 2007082719 | 7/2007 |

(Continued)

OTHER PUBLICATIONS

Examination Report in European Patent Application No. 16701018.0, dated Sep. 7, 2018.

(Continued)

*Primary Examiner* — Rebecca E Song
(74) *Attorney, Agent, or Firm* — Scarinci Hollenbeck

(57) ABSTRACT

A network node is described which is configured for use in space, comprising a transmission interface for transmitting radio frequency signals, a reception interface for receiving radio frequency signals, a network management module for determining communication session information, a controller arranged to control the transmission interface and the reception interface in accordance with session information provided by the network management interface, wherein the transmission and reception interfaces are for receiving data from terrestrial nodes and space-borne nodes. Also described are a network entity comprising the network note and a plurality of adaptive antennas, a satellite containing the network entity and a user equipment device configured for communication with the network node.

16 Claims, 4 Drawing Sheets

(56) References Cited

U.S. PATENT DOCUMENTS

| | | | |
|---|---|---|---|
| 2008/0081626 A1* | 4/2008 | Choi | H04B 7/155 |
| | | | 455/442 |
| 2009/0028087 A1 | 1/2009 | Nguyen | |
| 2011/0053628 A1* | 3/2011 | Kim | H04B 7/18539 |
| | | | 455/509 |
| 2013/0084884 A1* | 4/2013 | Teyeb | H04W 48/04 |
| | | | 455/456.1 |
| 2013/0169806 A1* | 7/2013 | Wu | H04B 7/18508 |
| | | | 348/144 |

FOREIGN PATENT DOCUMENTS

| | | |
|---|---|---|
| WO | 2010029413 | 3/2010 |
| WO | 2013/130778 | 9/2013 |

OTHER PUBLICATIONS

The International Search Report and The Written Opinion; dated Apr. 15, 2016.

\* cited by examiner

SPACE NETWORK NODE RECEIVING DATA FROM TERRESTRIAL AND SPACE NODES

The present invention relates to a network node, and particularly, but not exclusively, to a network node for use in a communications system using complementary terrestrial and space-based technology to support a plurality of applications.

Various reports and resources are available to inform that the requirement for access to data is growing at an increasing rate. In addition to high data rate services such as video, the growth in machine-to-machine (M2M) communication and other lower rate services also stretch the capacities of the various communications networks. Similarly, types of data used in communication systems are set to evolve. In the field of space technology, for example, there is the expected growing demand for Earth Observation and other sensor data available in, or near, real-time.

To address this growing demand, various satellite systems have been proposed and implemented including various constellations in Low Earth Orbits (LEO), Medium Earth Orbits (MEO), Geostationary Orbit (GEO) and others, in order to implement large-scale communications networks.

Historically, the high costs of designing and implementing satellite systems have meant that they have been conceived of in isolation from each other and largely dedicated to a single application or mission, the mission being one of the following major categories:

Earth Observation (covering civil and military applications);
Science (e.g. the Rosetta mission to a comet);
Exploration (e.g. the Curiosity mission to Mars);
Navigation and providing global positioning satellites used for satnav applications (also known as global navigation satellite systems (GNSS));
Telecommunications covering satellite systems for Broadcast Satellite Service (BSS), Fixed Satellite Service (FSS), Mobile Satellite Service (MSS) or Military applications.

Communications networks using such satellite systems are often constructed on an ad-hoc basis, based on establishment of point-to-point links. Networks can also be proprietary, with devices on different networks unable to interact—one such barrier to interaction lies in frequency spectrum division, with networks for different applications being configured to operate in separate frequency bands to avoid interference, and/or for security. Typically, as further missions and applications are designed, the spectrum allocation is performed on the basis of division into smaller and smaller bandwidths.

Frequency co-ordination therefore becomes more and more difficult as the number of developed missions and applications increases, to the extent that it has now become a significant problem. Accordingly, optimisation of systems within certain frequency bands has been the focus of innovation of new communications networks so that the problem of frequency allocation can be avoided, and systems can make better use of available resources.

The difficulty with this approach, however, is that as system performance and capability increases, system requirements also increase, so that spectrum allocation is always a limiting factor.

In addition to frequency issues, more general harmonisation issues will be appreciated, such as technical incompatibility between devices running on different networks, in terms of the ability to process data of various formats, and data transmitted or received via different communication protocols. The core function of two devices on two different networks may be the same, but the two devices are specific to certain manufacturers or applications, and are configured for a specific use, even though the function provided by the devices is the same. There can thus be a high degree of redundancy caused by duplication of technology.

For the various categories of application area described above, the overall infrastructure requires a combination of ground as well as space-based technological components, referred to herein as "assets". For example, ground infrastructure includes a number of ground stations to control and operate the satellites, user terminals (e.g. satellite TV antenna and set top box), and associated operational software tools to support interconnectivity between all space and ground assets. These infrastructure assets have evolved independently. Indeed, further subdivisions occur as:

Earth observation, science, navigation and military satellites are largely institutionally run programmes run by different organisations. As a consequence, the entire infrastructure is independently developed by different organisations with different needs and applications to deal with. Often the operational infrastructure is divided along regional or National lines;
Commercial telecommunications satellites are implemented and operated by commercial satellite operators with some standardisation but independent infrastructure (orbital slots, ITU frequency allocations, ground segment, user terminal designs etc.).

Furthermore, integration of satellite systems with terrestrial networks such as the Internet and terrestrial wireless has tended to involve bespoke operator specific interface hardware and software.

There is therefore a need to solve these issues through some degree of standardisation to enable more effective use of resources. There is a particular need to address the issue of frequency allocation more effectively than at present, by providing a solution to this problem, rather than performing substantial system redesigns to avoid the problem for as long as possible, as is conventionally the preferred approach.

Embodiments of the present invention aim to provide a means to allow more efficient use of existing and future space, ground and air-based assets and their allocated spectrum, allowing integration and interoperation of multiple diverse assets. The integration of such assets, to be described in more detail below, is described in terms of the formation of a "confederation" of a diverse set of assets, forming a "ubiquitous global network".

It is noted that today fourth generation (4G) terrestrial networks, as defined by the 3rd Generation Partnership Project (3GPP) and embodied in the Long Term Evolution (LTE) specifications, provide Multi-Service Telecommunications to a variety of diverse users. Functionality associated with particular 3GPP specifications can be obtained from www.3gpp.org/specifications. Detailed functionality of these specifications and the terminology used therein are assumed to be well known to the skilled person, and so will not be explained in detail herein.

Such networks support applications needing transport of voice, video, high-rate data, Machine to Machine (M2M) and "Internet of Things" (IoT) traffic. In addition the 4G standards and architectures support inbuilt frequency and resource management in varying environments and it is to be expected that these capabilities will be retained and built on for the future fifth generation (5G) networks currently under definition. The principle of the asset integration of the present invention is based on the implementation of terrestrial networks, such as 4G networks, in space as a universal form of communications for future satellite constellations, creating a ubiquitous "space wide web" which comprises a confederation of space and ground assets able to interoperate seamlessly with high security and assuredness. This will enable consumers, commercial entities, institutions and government entities to have ubiquitous access to the many categories of applications and services which such a confederation affords.

Put another way, the asset integration of the present invention is achieved via the adoption of a flexible, secure, seamless Multi-Service Telecommunications backbone which enables the assets to communicate with each other with inbuilt control of interference and spectrum management.

In more detail, the technology of the present invention provides a key node in a communications network, analogous in functionality in one embodiment to the Evolved Node B (also known as an eNodeB or eNB) of LTE networks, on the satellites of such constellations, supporting session management, handovers and radio resource management for multiple diverse users as well as communications back into the terrestrial infrastructure.

According to an aspect of the present invention, there is provided a network node configured for use in space, comprising a transmission interface for transmitting radio frequency signals, a reception interface for receiving radio frequency signals, a network management module for determining communication session information, a controller arranged to control the transmission interface and the reception interface in accordance with session information provided by the network management interface, wherein the transmission and reception interfaces are for receiving data from terrestrial nodes and space-borne nodes.

The session information may include resource allocation information.

The resource allocation information may include information relating to communications traffic and the position and availability of network entities.

The resource allocation information may comprise frequency use information.

The session information may include handover control information.

The network node may provide the same network control functionality of the interface between a user equipment device and a packet core in a terrestrial network.

The terrestrial network may be an LTE network, and the network node may provide the same network control functionality as an Evolved Node B.

The network node may comprise means for encrypting and decrypting data.

The network management module may be arranged to determine session information for a first communication mode for communication to an entity in the terrestrial network via a satellite gateway, a second communication mode for direct communication to an entity in terrestrial network, a third communication mode for direct communication to a ground-based gateway to the terrestrial network, and a fourth communication mode for communication with another satellite.

According to another aspect of the present invention, there is provided a network entity comprising the network node as defined above, and further comprising a plurality of adaptive antennas connected to the transmission and reception interfaces, in which the plurality of adaptive antennas may support multiple input multiple output (MIMO), air interfaces.

The adaptive antennas may be configured to allow adaptive beam coverage for in-orbit dynamic reconfiguration to optimise the beam set for traffic patterns and location, and interference mitigation.

The network entity may comprise an inter-satellite link interface.

The controller may be arranged to interface with the controller of a satellite.

According to another aspect of the present invention, there is provided a satellite comprising the network entity as defined above for use in any or a combination of a geostationary orbit, geosynchronous, Low Earth Orbit, and a Medium Earth Orbit.

According to another aspect of the present invention, there is provided a user equipment device configured for communication with a space-borne network node as defined above.

The mechanisms according to embodiments of the present invention enable the coordination of the space and ground assets for many different applications in an efficient, resourceful and spectrum-efficient way to provide improved availability, quality of service (QoS) and quality of experience (QoE) in the support of applications needed by individuals and professional organisations.

Embodiments of the invention provide:
"Building block" inter-satellite link (ISL) capabilities based on laser and/or microwave technologies, supporting communications between satellites in diverse orbits (LEO, MEO, GEO and other orbits);
"Building block" sensors for flexible deployment as hosted payloads or indeed dedicated missions both in space and on airborne vehicles;
Adaptive receivers with cognitive and software-definable air interface support;
Advanced active antennas capable of providing adaptive coverage depending on satellite location, traffic demand and spectrum environment;
Advanced network management systems to optimise resource orchestration involving:
inter-satellite coordination and allocation of radio resource between satellites within the dynamic constellation;
satellite-ground co-ordination e.g. dynamic allocation of radio resources for hotspots;
mitigation of both intra-constellation and external interference within ITU spectrum allocations and regulations.

Embodiments of the present invention will now be described in detail by way of example only, in conjunction with the following drawings, in which.

Like reference numerals shall be understood as referring to like components throughout.

Figure 1:
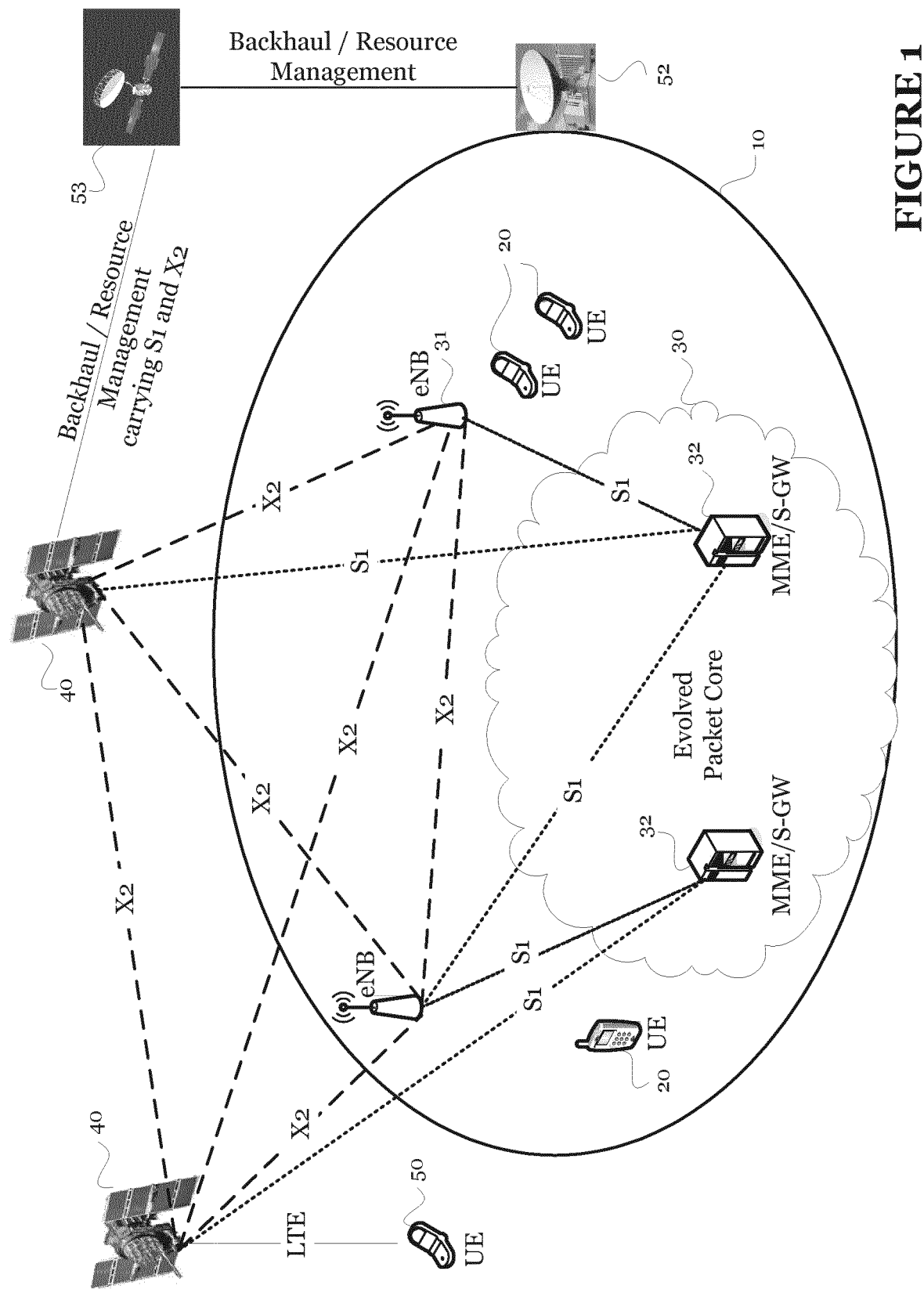
FIG. 1 illustrates a communications network using technology according to an embodiment of the present invention.

FIG. 1 illustrates a communications network using technology according to an embodiment of the present invention. The network will be described with reference to components and functionality of an LTE communications network such as a 4G or 5G network, for simplicity, but as explained below, it will be appreciated that the principles of the invention can be seen to apply to implementation of other types of communication network.

The communications network comprises terrestrial assets, contained within area 10, and space assets, shown outside area 10. The terrestrial assets include a number of terminals or mobile devices, also referred as user equipment (UE) 20. The UE devices communicate with the core terrestrial network architecture of an LTE network, referred to as the Evolved Packet Core (EPC) 30, via an air-interface node referred to as Evolved Node B 31 (eNodeB or eNB), and multiple eNBs are present. An eNB 31 is analogous to a base transceiver station in a GSM network. An eNB 31 has on-board control functionality to control communication between the UE devices 20 and the EPC 30.

The EPC 30 itself comprises control nodes 32 including Mobility Management Entities (MME) and Serving Gateway (S-GW) nodes which process and route data packets within the network. The MMEs and S-GWs 32, also provide the range of services defined in the LTE specifications as part of the existing terrestrial networks.

The space-based assets of the invention include a constellation of satellites 40, some of which have on-board what is referred to herein as a space-node. A space-node, as defined herein in the context of an LTE communications network, is a network node which mimics the functions of the terrestrial eNB 31, and is suitably adapted for the space environment. A space-node is able to provide services directly to the UE 20, and communicates with other eNBs 31 and space-nodes via the LTE-defined X2 protocol (shown in dashed lines) which defines communication between neighbouring eNBs, and with the MME and S-GW nodes 32 via the LTE-defined S1 interface protocol (shown in dotted lines), which defines communication between an eNB 31 and the evolved packet core 30. One of the satellites 40 is shown as communicating directly with a UE device 50 in space via LTE communication protocols. Another satellite 53 e.g. a geostationary satellite) is shown serving as a gateway 52 to the terrestrial network.

The space-nodes provide the range of services defined in the LTE specifications for eNB which include the following subset of functions:
  Radio Resource Management including admission control, mobility control, and allocation of radio resources to UEs, co-ordinating with the other network space-nodes and eNBs;
  Routing of user data to the S-GW with any necessary IP header compression and encryption of the data;
  MME selection at UE attachment for scheduling and transmission of paging messages and broadcast information originating from the MME or via the MME from network operations and management entities;
  Modulation and demodulation of the downlink and uplink data streams respectively for the various user links;
  Agile conversion to and from the RF operating frequencies of the User Links (UL) which for the purposes of this example of embodiment will be Ultra-High Frequencies (UHF) or frequencies within the L- and S-bands but could be in any other frequency band, including satellite bands such as C, Ku or Ka depending on terminal and spectrum allocation evolution, so as to co-exist interference free with other space and/or terrestrial operators (such operators or users may be considered as "external" to the network in which the space-node is configured).

The space-nodes also embody specific new interfaces over and above those for a terrestrial eNB:
  One or more standardised data interfaces to/from any hosted payloads on the satellite whether Earth Observation, Science or Navigation;
  A Control Data Interface (CDI) to an on-board controller as described later.

Accordingly, in addition to the physical adaptations required to enable a space-node to function in a space environment, a space-node therefore contains functional adaptations with respect to the eNB to enable space-based applications as well as protocol adaptations to account for the Doppler and latency issues of space based operation.

Through the arrangement shown in FIG. 1, combining existing terrestrial assets with the space-nodes of the present invention, the following effects can be achieved:
  Full integration between space and ground networks;
  Confederation of multiple types of space assets such as Earth Observation and Science satellites;
  Incorporation of satellite-specific spectrum rules and frequency planning to mitigate inter-satellite system, intra-satellite system and space/ground interferences;
  Adaptability to rapidly changing Radio Frequency environments due to non-geostationary satellite constellations forming part of the confederated assets.
  RF capability to reach small "smartphone" terminals modified only as needed to allow access to satellite communications spectrum.

These effects will be described in more detail below.

Figure 2:
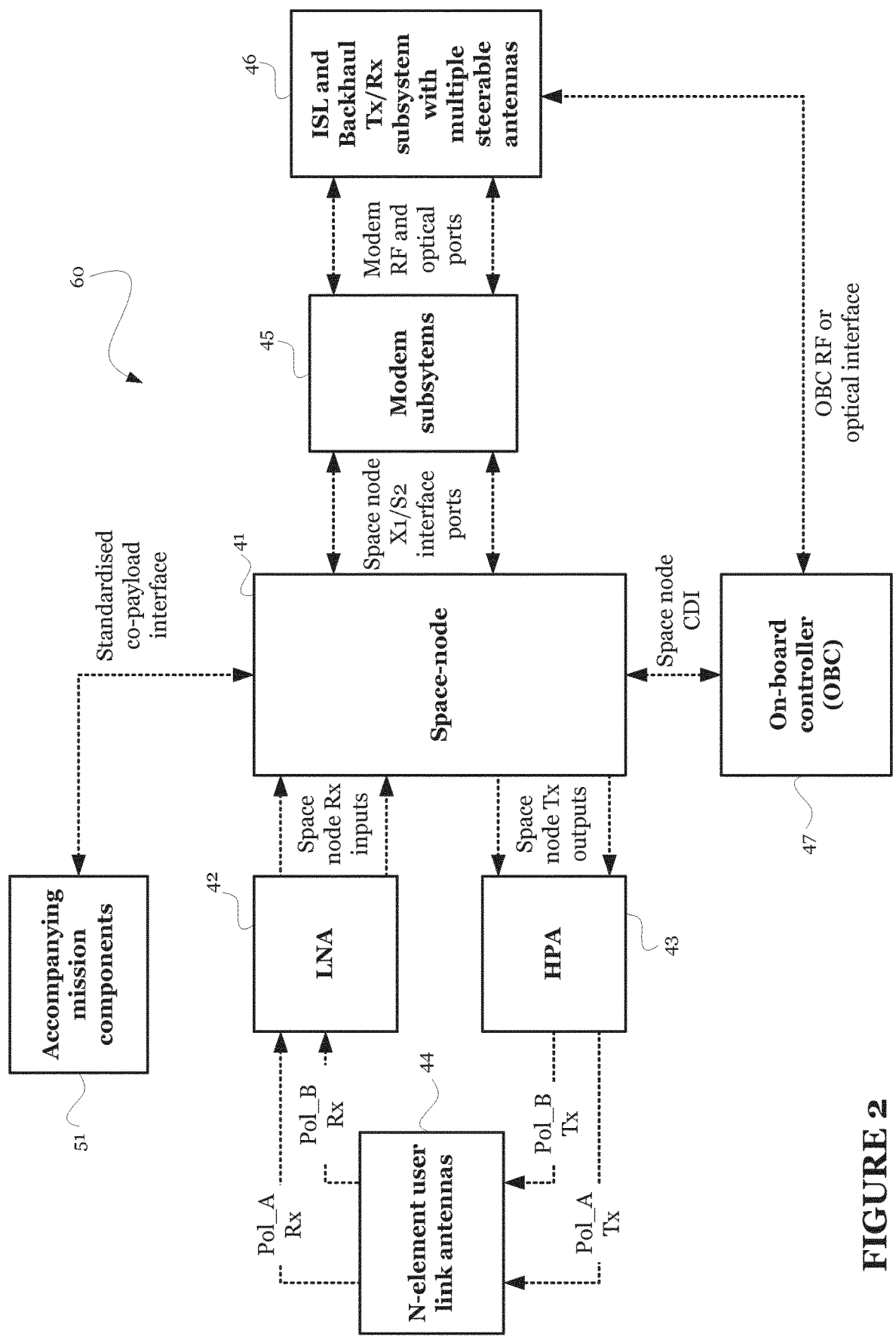
FIG. 2 illustrates the architecture of a satellite payload according to an embodiment of the present invention.

FIG. 2 illustrates the architecture of a satellite payload 60 according to an embodiment of the present invention, which is provided on board a satellite 40 in the network shown in FIG. 1.

The satellite payload contains the following components:
  A space-node 41;
  Receive Low Noise Amplifiers (LNA) 42 at the operating frequency of the user links, for amplification of weak signals;
  Transmit High Power Amplifiers (HPA) at the operating frequency of the user links;
  An antenna system 44 at the User Link frequencies having a plurality, e.g. integer N, elements capable of generating beams with enough gain to allow some level of frequency re-use and support communications to small UE terminals 20, such as smartphones. The antenna system 44 can be any of Single Feed Per Beam (SFPB), Array Fed Reflector (AFR) or Direct Radiating Array (DRA) types. The LNA 42 and HPA 43 are arranged between the antenna system 44 and the space-node 41. In FIG. 2, signals having two different polarisations (Pol_A and Pol_B) are shown a being transmitted or received to/by the space-node 41;
  One or several modem subsystems 45 for the one or several digital ports of the space-node 41 supporting X2 and S1 interfaces, which also has the function of converting them to the bands to be used for Inter Satellite Links (ISL) and the links to the ground according to the various backhaul modes to be described in more detail below. The bands in question could be Ku, Ka, Q, V and optical and a given satellite implementation may use several bands. These ISL and network gateway frequencies may also be adapted by the space-node to enable the links to co-exist interference free with other space and/or terrestrial operators at any desired frequency;
  A transmit and receive subsystem 46 at the backhaul mode frequencies, interfacing to one or several typically steerable antenna systems at the relevant frequencies;

An On Board Controller (OBC) 47 to be used for satellite-specific spectrum and resource management which interfaces with the space-node 41 to allow enhanced control of and interaction with the Radio Resource Management functionality native to the space-node 41, to be described in more detail below;

This OBC interfacing to the CDI of the space-node 41 described above and to the transmit and receive subsystem 46 described above.

A satellite 40 equipped with the payload 60 described above is capable of receiving uplink signals from a terrestrial network, amplifying those signals via the LNA 42, and passing the signals to the space-node 41. On receipt of the signal, the space-node 41 performs the control and routing which would be achieved at the air-interface provided by an eNB 31 in a purely terrestrial LTE network, enabling integration of the satellite into the terrestrial network via a protocol, the integration being in the manner of a 4G or 5G LTE network, for example. Depending on the intended destination of the signal, appropriate routing and frequency conversion is performed by the space-node 41. For example, if the signal is for forwarding to another satellite 40, the space-node 41 routes the signal to the ISL 46 via an appropriate modem subsystem 45. The ISL 46 represents a transceiver such as an antenna which can communicate with a corresponding transceiver on another satellite 40 to exchange signals.

In this example, the OBC 47 is responsible for controlling the frequency band in which the signal should be transmitted over the ISL 46. Frequency allocation is performed dynamically, so that the communications system can adapt to different user links, and spectrum usage, incoming signals from other satellites over the ISL, the needs of various applications, and physical positioning. Such an approach enables spectrum sharing so as to enable co-existence of the signal with those of other space and/or terrestrial networks without interference, at any desired frequency.

A ground-based Space Resource Optimiser (SRO), not shown, which interfaces to the space-borne and air-borne OBC 47 via any or all of the backhaul modes described below, allows resource optimisation profiles to be configured in the OBC 47. These profiles comprise, but are not limited to, frequency allocations, priorities and mappings for all the satellite constellation frequencies and relevant orbit details and ephemerides. Accordingly, the OBC 47 uses information provided from the SRO, as well as locally obtained information such as position and timing data, to determine which information from the SRO should be used in processing a received uplink signal. Similarly, for signals received at the satellite via the ISL 46, the OBC 47 may control receipt of the signal for forwarding of the signal via the space-node 41 to the downlink, via the HPA 43.

In a modification of the structure explained above, the OBC 47 may be configured within the space-node 41, rather than interfacing with the space-node 41 via the CDI. The space-node 41 is thus capable of implementing and performing dynamic resource allocation, which opens accessibility to the large scale provided by the space assets. As an example, a UE device such as a mobile terminal 21 may be able to communicate directly with a space-node 41 in the same way as it would conventionally communicate with an eNB 31, with only the capability to transmit data at a radio frequency suitable for communication with the space-node 41 being required. The space-node 41 can take over the subsequent routing of data over the ubiquitous network. In one embodiment, the space-node 41 may send a control signal to the mobile terminal 21 to select a particular transmission frequency dependent on available resources and traffic.

The satellite payload 60 of FIG. 2 can be provided as a kit for installation on a conventional satellite and subsequent launch into space with the satellite. Alternatively, the payload may be installed on High Altitude Platforms (HAPS). In space, the payload 60 may interface with other accompanying mission components 51 on the same satellite or on different satellites, over a standardised interface.

The backhaul communications modes referred to above will now be described with respect to FIG. 3. In telecommunications terminology, the "backhaul" relates to the link between the core network, and subnetwork units, such as a base station. The backhaul can be seen as linking the first level of wireless devices to a core terrestrial wired network. In the network of FIG. 1, for example, the backhaul relates to the link between the EPC devices 30 such as an MME 32 and the satellites 40. "Backhaul" contrasts with "Fronthaul" in telecommunications terminology, which is the link connecting new network devices to those devices linked to the core via the backhaul. An example is the link between a remote radio head and a wireless base station.

Figure 3:
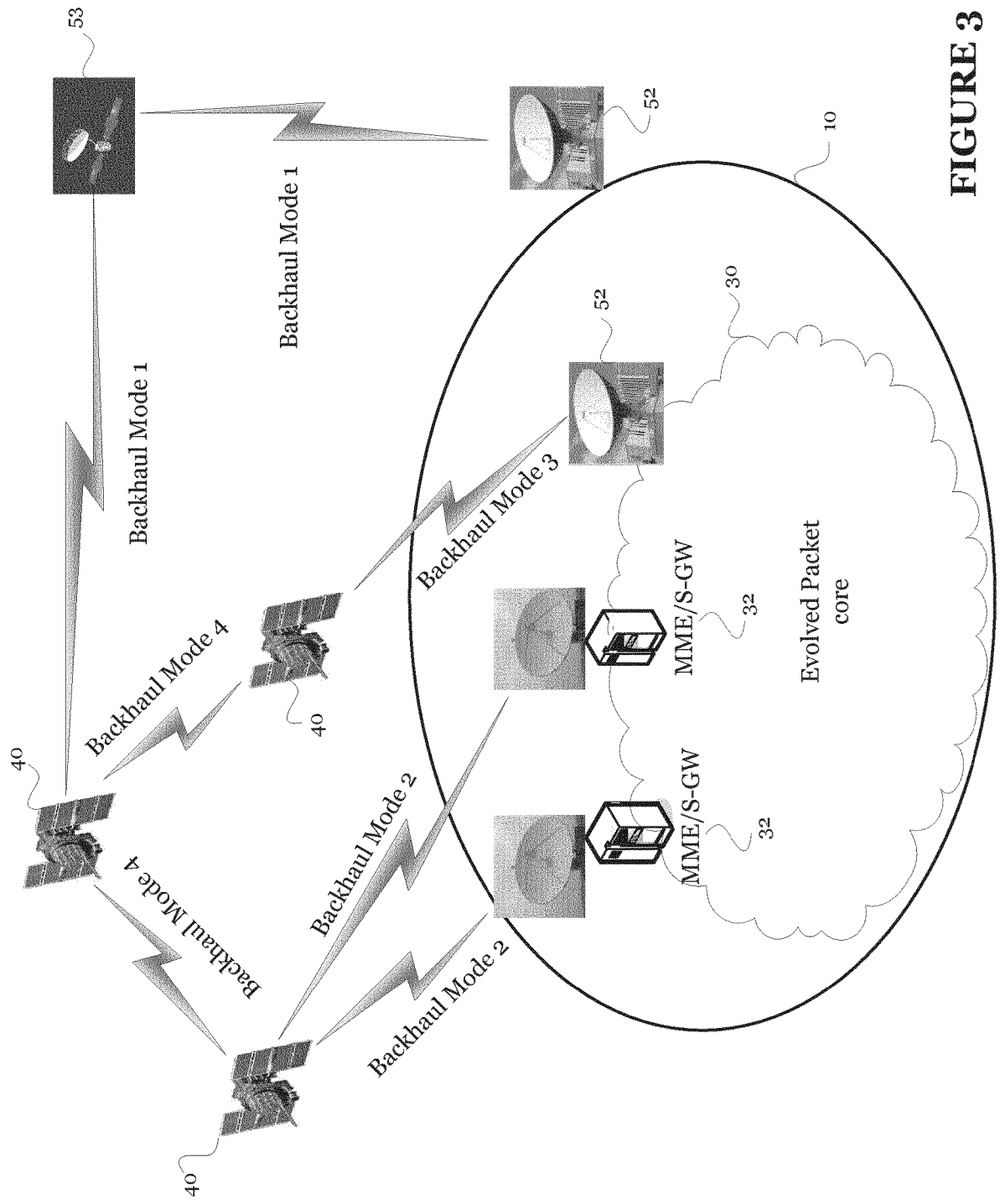
FIG. 3 illustrates backhaul communication modes used in the arrangement of FIG. 1.

There are four backhaul communication modes in the network of FIG. 1, and these are illustrated in FIG. 3. These will be referred to as backhaul modes (BM) 1 to 4, and each mode may adopt a different modulation scheme, or transmission frequency, and relate to different aspects of control of a space-node. The four backhaul modes account for the Doppler and latency issues of space-based operation.

BM1 describes indirect communication via a geostationary satellite 53, for example, between a space-node 41 and a ground gateway 52 to the terrestrial networks.

BM2 describes direct communication between a space-node 51 and terrestrial eNB 31, MME and S-GW entities 32 equipped with transceivers suitable for communication with space, and this communication is possible if these entities are suitably modified to directly interface to the satellites 40.

BM3 describes direct communication between a space-node 41 and ground gateway 52 to the terrestrial networks.

BM4 describes Inter Satellite Links (ISL) to the space-node satellites. BM 1-4 cover all of the possible communication types between the terrestrial assets and the space-based assets of the network according to an embodiment of the present invention. In any particular communication path between two network nodes, some or all modes may be used.

BM1 to BM3 are used for resource management, and carry both S1 and X2 communications. Resource management communications include those described above between a ground-based SRO and a satellite OBC 47. BM4 carries X2 communications. Based on the LTE architecture specifications, S1 communications represent those between an eNB 31 and the packet core 30, and X2 communications represent those between neighbouring eNBs 31. Consequently, the analogy between terrestrial network communications and the networks using embodiments of the present invention can be seen through the inclusion of X2 communications into space as BM1 and BM4 modes. In other words, through the presence of the space-nodes 41 mimicking the functionality of a terrestrial eNB 31, the benefits of terrestrial LTE communication can also be achieved in space in, for example, inter satellite links.

Figure 4:
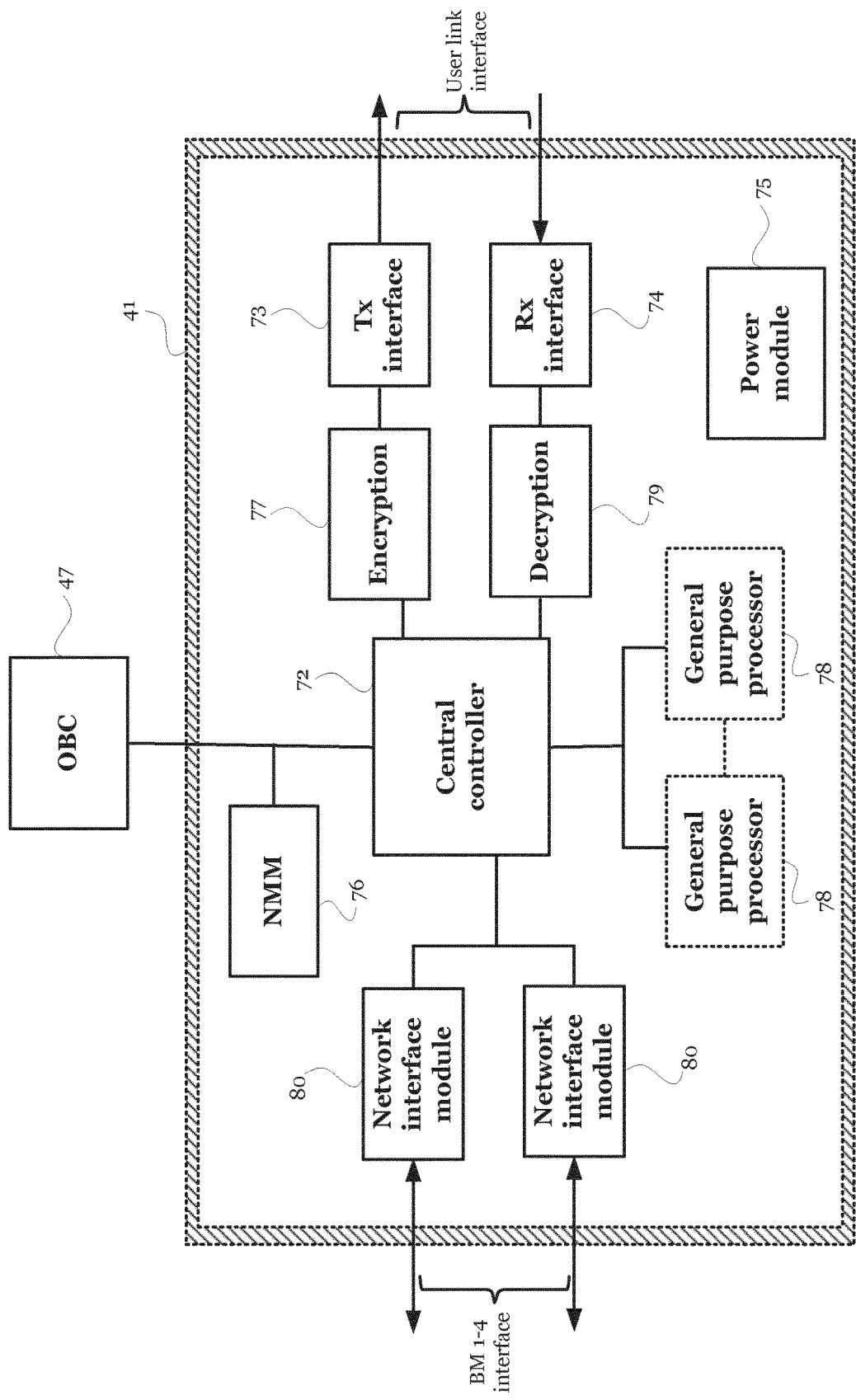
FIG. 4 illustrates the architecture of a space-node according to an embodiment of the present invention.

FIG. 4 illustrates the architecture of a space-node 41 according to an embodiment of the present invention. Physically, the space-node is a network entity having the form of a portable base station transceiver which can be fixed to a satellite, and the term "space-node" reflects the logical role and physical position of this entity in the network.

The space-node 41 contains thermal and electro-magnetic shielding 71 on its exterior to ensure its suitability for operation in the space environment and to ensure survival of a launch process. The shielding 71 may be of any suitable form known to the skilled person for protection of electronic components in space. Secure internal mounting of hardware racks to the casing of the space-node 41 is also provided.

The space-node 41 comprises a central controller 72 which controls the operation of the other components of the space-node 41 and which may interface with the OBC 47 on the host satellite. In another embodiment, the controller 72 may be the OBC 47 itself. The space-node 41 comprises transmission and reception interface modules 73, 74 which are capable of supporting transmission and reception of telecommunications data to and from the HPA 43 and LNA 42 as described above. The controller 72 is arranged to control the interface modules 73, 74 on the basis of information received from an SRO, such that spectrum allocation for transmission and tuning of the receivers of the space-node 41 may be performed appropriately. In addition, the controller in conjunction with interface modules 73, 74, encryption module 77 and decryption module 79 (described below) supports the signal conditioning for the various LTE transmission modes including MIMO. The space-node also contains network interface modules 80 which interface modem subsystems 45 to provide and support BM 1-4.

The space-node 41 comprises a power module 75 for providing operating power to the components of the space-node. The power may be derived from solar panels on the host satellite, and regulated appropriately by the power module. The connections from the power module 75 to the other components of the space-node 41 are not shown, for simplicity.

The space-node 71 comprises a number of subsidiary control modules including, but not limited to a network management module (NMM) 76, an encryption, modulation and encoding module 77 and a decryption, demodulation and decoding module 79. Additional general-purpose control modules 78 may be included for expansion of functionality through in-situ programming via control signals provided to the space-node from a ground station. These control modules are arranged to connect to the central controller 72, and are powered down until they are operational.

The NMM 76 performs the core local functionality and allows for some of the functionality of the terrestrial EPC 30 such as S-GW and MME to be provided locally on the satellite potentially improving latency. The NMM 76 performs at least one of session management, handover control and radio resource management, which can be collectively referred to as "intelligent network configuration". In general terms, the NMM 76 is able to determine, for a particular request for data or services, which communications need to be made in order to obtain that data or provide the service, and to control such communications accordingly. Data may be forwarded to another space-node 41 via BM4, to the terrestrial network via a space-based gateway provided on a geostationary satellite 53 via BM1, directly to a terrestrial gateway 52 via BM3, or to an appropriate S-GW 32 via BM2. The NMM 76 may also perform appropriate modulation or demodulation of data to a frequency determined by information received from the controller or SRO, although in an alternative embodiment, such functionality may be devolved to the interface modules 73, 74 themselves.

Scheduling of any of these communications may be performed based on priorities, availability of services, information provided relating to movement of a UE device 20 and so on. Resource availability may be a key function of such scheduling, and the NMM 76 is able to determine the relative positions and availabilities of other satellites 40 or terrestrial eNBs 31, or available spectrum bandwidth, in order to determine whether a particular communication can be achieved. Based on the number of communications which can be made to other devices, and the position of the space-node 41, which may be derived from information received at the OBC 47 from e.g. local satellite sensors or components, the NMM 76 may also control the availability of the space-node 41 as a resource to be used in communications from other space-nodes. In this manner, together with frequency allocation information provided from the SRO, the NMM 76 achieves dynamic resource allocation.

The NMM 76 is thus an intelligent software module which contains a number of algorithms designed to optimise communication through the space-terrestrial network of the present invention, using the principles of such operation used in conventional terrestrial eNBs 31. Additionally, however, the NMM 76 provides the adaptation required for a space-node 42 to support communication according to modes BM1-BM4, based on determination of available resources in space and dynamic allocation of resources. The NMM 76 determines session information, including resource allocation information and/or handover information, which is provided to the controller 72 to control the transmission and reception interfaces.

In addition, the space-node 41 may comprise (not shown) a number of signal processing stages such as analogue-to-digital and digital-to-analogue converters, amplifiers and noise filters to ensure exchange of data between the control stages is reliable. Means may also be provided to identify specifically interference between different frequency bands and both inter and intra-constellation interference can be identified. Where interference exists between communication channels involving physically distinct communication paths the signal processing described above may be adapted enabling noise to be eliminated more effectively and signal levels to be optimised. In cases where noise reduction is not possible, the controller 72 may identify this and report to the NMM which may update its resource allocation, or may alternatively report to a ground station that a particular communications link is experiencing unexpected problems. The mappings provided by the SRO may be updated accordingly to temporarily avoid use of a particular link. Such situations may occur due to the transient presence of space debris, for example, in a particular line-of-sight between two space-nodes.

It is not essential for the space-node 41 to perform encryption of all data traffic, and to this extent the encryption and decryption functions of modules 77 and 79 respectively may not be activated in all embodiments of the present invention, but encryption, or inclusion of specific error correction codes, may be required for certain applications. As an example, BM4 communications over the ISL may be controlled to have a universal error correction scheme which is implemented by each space-node. In addition, the encryption may include a form of compression, such as IP packet header compression.

Encryption may be performed using a number of known algorithms to avoid interference between channels in a satellite constellation or to provide security and assuredness of the passage of data through the network. The encryption module 77 may additionally be configurable, via a ground link, during use so that more sophisticated, or more specific encryption schemes may be implemented in the future.

Although the term "encryption" is used herein, corresponding decryption may of course be provided in addition.

An encryption, modulation and encoding module 77 is connected to the transmission interface 73, while a decryption, demodulation and decoding module 79, where used, is connected to the reception interface 74. Each module may contain on-board memory to store data to enable appropriate encryption/decryption, and may store a number of algorithms in non-volatile memory, for appropriate selection for a particular application.

Another embodiment of the present invention could include mechanisms within the space-node 41, modem subsystems 45 and ISL/backhaul subsystem 46 to optimally control the resources used. If the output of the data is processed as a control signal, for example, where received data is provided to control a space-node, and interpreted and actioned by the space-node 41 that the data is to be relayed to a another space-node 41 or a terrestrial eNB 31, the NMM 76 then determines the resources available and reports to the modem subsystems 45 and the ISL/backhaul subsystem 46 as to how such further transmission is to be carried out, so that the transmission can be controlled accordingly.

Although it is described above that the entire architecture 60 shown in FIG. 2 can be presented as a kit for installation on a satellite 40, it is also possible to provide individual space-nodes 41 for installation, and to use existing architecture where supported. For example, a satellite may already contain the hardware needed to communicate with another satellite, or uplink and downlink circuitry such as an LNA 42 and an HPA 43, and so use of this technology can be made where appropriate, with only the space-node being installed. For this reason, the present invention in its core form can be described as being embodied by a space-node 41, with extensions of the space-node and systems including the space-node falling within the scope of the present invention.

It will be appreciated by the skilled person that modifications may be made to the embodiments described above which fall within the scope of the claims. Compatible features may be combined, and references to "one" component may be interpreted as "one or more" component. Examples of such modifications include, but are not restricted to, those set out below:

- On the user link of the satellite payload, two or more antenna elements can be used to support the Multiple In Multiple Out (MIMO) air interface that LTE defines for enhanced link performance.
- As an extension of the previous point, multiple satellites may be involved in a communication using MIMO, or to support and/or enhance the massive MIMO systems proposed for 5G.
- Advanced Software Defined Radio (SDR) and cognitive radio techniques can be used in the space-node to allow:
  - Re-configurability for evolutions of the air interface.
  - Better interoperability and reduced interference between space and ground networks.
  - Increased security capabilities for certain applications.
- A space-node may have limited inherent beamforming capability, but this can be extended to allow adaptive beam coverages from an AFR or DRA to allow:
  - In orbit dynamic reconfiguration to optimise the beam set for traffic patterns and location of the satellite.
  - In orbit dynamic reconfiguration to optimise the beam set for interference mitigation.
- Hosting of the space-node 41 on any of, or a combination of, geostationary satellites, geosynchronous satellites, LEO satellites, MEO satellites, is possible. The architecture of the invention is what enables the invention to operate across these different technologies.

The space-node described herein can fully support LTE/4G and ultimately 5G services capable of fully interoperating with terrestrial LTE networks and using the extensive advanced network features afforded by LTE, making use of the established interfaces to users and other LTE nodes adapted for the space environment of the space-nodes. The skilled person will also appreciate that it is not necessary to configure the present invention exclusively on the principles of an LTE network. The principle described herein is to mimic certain aspects of terrestrial communication networks via a network entity adapted for use in space, so as to facilitate the means through which a ubiquitous global network can be developed. In the future, for example, the space-node may not mimic the control functionality of an eNB, but that of a transceiver station defined according to a new protocol, and such future modifications are intended to fall within the scope of the claims, through the functional definition of the space-node which is provided.

Although the networks of embodiments of the present invention can provide such a ubiquitous network themselves, they can also be seen as building blocks, or the "backbone" of future development of the network. For example, the network shown in FIG. 1 can be seen as an "enhanced" version of a terrestrial packet core, and operators such as network service providers, governments, the military and so on are able to take advantage of the functionality of this enhanced core by joining the network through connection to existing resources, leaving the previously problematic issue of frequency allocation, for example, to one or more space-nodes. The enhanced core can thus provide the basis of communication in a "future state", in which individual mission-based satellites are not needed, but space-nodes on-board existing satellites can instead provide the necessary means to enable such communication with a number of terminals or sensors used in space or airborne vehicles for particular missions. The missions can thus be configured using a number of components as "building blocks" which can interoperate via standardised interfaces to one or more space nodes of the invention.

The invention claimed is:

1. A satellite payload, comprising:
a network node, wherein the network node comprises:
  a transmission interface for transmitting radio frequency signals;
  a reception interface for receiving radio frequency signals;
  wherein the transmission and reception interfaces are arranged to interface with a terrestrial network and a space-borne network;
  an intelligent software module arranged to determine handover control and radio resource management information using positions and availabilities of communications resources in the terrestrial and the space-borne network;
  a controller arranged to control the transmission interface and the reception interface in accordance with the handover control and radio resource management information determined by the intelligent software module,
  wherein the transmission interface and the reception interface are standardized interfaces to allow the network node to perform control of the terrestrial network to standardize communication between the terrestrial network and the space-borne network.

2. The satellite payload according to claim 1, wherein the radio resource management information includes resource allocation information.

3. The satellite payload according to claim 2, wherein resource allocation information includes information relating to communications traffic and the position and availability of network entities.

4. The satellite payload according to claim 2, wherein the resource allocation information comprises frequency use information.

5. The satellite payload according to claim 4, wherein the frequency use information enables signals transmitted and/or received by the respective transmission and/or reception interfaces to co-exist with signals associated with external space-based and/or terrestrial users without interference.

6. The satellite payload according to claim 2 wherein the network node has the same network control functionality as the interface between a user equipment device and a packet core in a terrestrial network.

7. The satellite payload according to claim 6, wherein the terrestrial network is an LTE network, and the network node provides the same network control functionality as an Evolved Node B.

8. The satellite payload according to claim 1, wherein the network node comprises software for encrypting and decrypting data.

9. The satellite payload according to claim 1, in which the intelligent software module processes an optimization algorithm to determine handover control and radio resource management information for:
 a first communication mode for communication to an entity in the terrestrial network via a satellite gateway;
 a second communication mode for direct communication to an entity in terrestrial network;
 a third communication mode for direct communication to a ground-based gateway to the terrestrial network; and
 a fourth communication mode for communication with another satellite.

10. A network entity comprising the satellite payload according to claim 1 and further comprising a plurality of adaptive antennas connected to the transmission and reception interfaces, in which the plurality of adaptive antennas support multiple input multiple output, MIMO and air interfaces.

11. The network entity according to claim 10 in which the adaptive antennas are configured to allow adaptive beam coverage for in-orbit dynamic reconfiguration to optimize the beam set for traffic patterns and location, and interference mitigation.

12. The network entity according to claim 11 in which the controller is arranged to interface with the controller of a satellite.

13. The network entity according to claim 10 comprising an inter-satellite link interface.

14. The network entity according to claim 13 in which the controller is arranged to interface with the controller of a satellite.

15. A satellite comprising the network entity of claim 11 for use in any or a combination of a geostationary orbit, geosynchronous, Low Earth Orbit, and a Medium Earth Orbit.

16. A user equipment device configured for communication with the satellite payload according to claim 1.

* * * * *